(12) United States Patent
Palladino et al.

(10) Patent No.: US 11,750,474 B2
(45) Date of Patent: *Sep. 5, 2023

(54) MICROSERVICES APPLICATION NETWORK CONTROL PLANE

(71) Applicant: KONG INC., San Francisco, CA (US)

(72) Inventors: Marco Palladino, San Francisco, CA (US); Augusto Marietti, San Francisco, CA (US)

(73) Assignee: KONG INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/938,263

(22) Filed: Oct. 5, 2022

(65) Prior Publication Data

US 2023/0023975 A1 Jan. 26, 2023

Related U.S. Application Data

(60) Division of application No. 17/498,631, filed on Oct. 11, 2021, now Pat. No. 11,489,738, which is a
(Continued)

(51) Int. Cl.
| | |
|---|---|
| *H04L 41/5025* | (2022.01) |
| *G06F 11/34* | (2006.01) |
| *H04L 43/0817* | (2022.01) |
| *H04L 43/062* | (2022.01) |
| *H04L 43/16* | (2022.01) |

(Continued)

(52) U.S. Cl.
CPC ...... *H04L 41/5025* (2013.01); *G06F 11/3428* (2013.01); *H04L 12/66* (2013.01); *H04L 41/0661* (2023.05); *H04L 41/0816* (2013.01); *H04L 43/062* (2013.01); *H04L 43/0817* (2013.01); *H04L 43/16* (2013.01); *H04L 67/133* (2022.05); *H04L 67/51* (2022.05); *H04L 67/56* (2022.05)

(58) Field of Classification Search
CPC ... H04L 41/5025; H04L 67/51; H04L 67/133; H04L 67/56; H04L 12/66; H04L 41/0672; G06F 11/3428

See application file for complete search history.

(56) References Cited

U.S. PATENT DOCUMENTS

| | | | |
|---|---|---|---|
| 7,788,536 | B1 | 8/2010 | Qureshi et al. |
| 8,625,757 | B1 | 1/2014 | Karpov et al. |

(Continued)

FOREIGN PATENT DOCUMENTS

| | | | | |
|---|---|---|---|---|
| WO | 2008094540 | A1 | 8/2008 | |
| WO | 2019203785 | A1 | 10/2019 | |
| WO | WO-2019203785 | A1 * | 10/2019 | ............ G06F 9/547 |

*Primary Examiner* — Christopher B Robinson
(74) *Attorney, Agent, or Firm* — Perkins Coie LLP; Colin Fowler

(57) ABSTRACT

Disclosed embodiments are directed at systems, methods, and architecture for operating a control plan of a microservices application. The control plane corresponds with data plane proxies associated with each of a plurality of APIs that make up the microservices application. The communication between the data plane proxies and the control plane enables automatic detection of service groups of APIs and automatic repair of application performance in real-time in response to degrading service node conditions.

20 Claims, 14 Drawing Sheets

Related U.S. Application Data continuation of application No. 16/714,662, filed on Dec. 13, 2019, now Pat. No. 11,171,842.

(60) Provisional application No. 62/896,412, filed on Sep. 5, 2019.

(51) Int. Cl.
　　*H04L 12/66*　　　(2006.01)
　　*H04L 41/0816*　　(2022.01)
　　*H04L 67/51*　　　(2022.01)
　　*H04L 67/56*　　　(2022.01)
　　*H04L 67/133*　　 (2022.01)
　　*H04L 41/0659*　　(2022.01)

(56) References Cited

U.S. PATENT DOCUMENTS

| | | |
|---|---|---|
| 8,756,617 B1 | 6/2014 | Boodman et al. |
| 8,819,629 B2 | 8/2014 | Sherrill |
| 9,027,039 B2 | 5/2015 | Michels et al. |
| 9,577,916 B1 | 2/2017 | Chou et al. |
| 9,602,468 B2 | 3/2017 | Tubi et al. |
| 9,716,617 B1 * | 7/2017 | Ahuja ............... H04L 41/0803 |
| 9,936,005 B1 | 4/2018 | Palladino et al. |
| 9,959,363 B2 | 5/2018 | Kaplinger et al. |
| 9,967,285 B1 | 5/2018 | Rossman et al. |
| 10,379,838 B1 | 8/2019 | Chud |
| 10,621,005 B2 | 4/2020 | Wong et al. |
| 2004/0070604 A1 | 4/2004 | Bhat et al. |
| 2004/0250176 A1 | 12/2004 | Brown et al. |
| 2005/0027797 A1 | 2/2005 | San Andres et al. |
| 2005/0262475 A1 | 11/2005 | Halpern |
| 2006/0195840 A1 | 8/2006 | Sundarrajan et al. |
| 2007/0002731 A1 | 1/2007 | Misra |
| 2007/0280206 A1 | 12/2007 | Messer et al. |
| 2010/0042712 A1 | 2/2010 | Lindem et al. |
| 2010/0241846 A1 | 9/2010 | Sundarrajan et al. |
| 2011/0087783 A1 | 4/2011 | Annapureddy et al. |
| 2012/0124647 A1 | 5/2012 | Simula et al. |
| 2013/0132582 A1 | 5/2013 | Kim et al. |
| 2013/0132584 A1 | 5/2013 | Palladino et al. |
| 2013/0227291 A1 | 8/2013 | Ahmed et al. |
| 2014/0040863 A1 | 2/2014 | Hale et al. |
| 2014/0068047 A1 | 3/2014 | Williams et al. |
| 2014/0281739 A1 | 9/2014 | Tuffs et al. |
| 2014/0282053 A1 | 9/2014 | Hauschild et al. |
| 2014/0289699 A1 | 9/2014 | Paterson et al. |
| 2014/0366080 A1 | 12/2014 | Gupta et al. |
| 2014/0379938 A1 | 12/2014 | Bosch et al. |
| 2015/0301883 A1 | 10/2015 | Talla et al. |
| 2015/0301886 A1 | 10/2015 | Watanabe |
| 2015/0312364 A1 | 10/2015 | Bayliss et al. |
| 2015/0319154 A1 | 11/2015 | Balakrishnan et al. |
| 2015/0350341 A1 | 12/2015 | Daute |
| 2016/0048408 A1 | 2/2016 | Madhu et al. |
| 2016/0173578 A1 | 6/2016 | Sharma et al. |
| 2016/0269926 A1 | 9/2016 | Sundaram |
| 2017/0012838 A1 | 1/2017 | Kashtan et al. |
| 2017/0060577 A1 | 3/2017 | Schreiber et al. |
| 2017/0063989 A1 | 3/2017 | Langouev et al. |
| 2017/0124210 A1 | 5/2017 | Suter et al. |
| 2017/0019468 A1 | 6/2017 | Charlton, III et al. |
| 2017/0187835 A1 | 6/2017 | Lim et al. |
| 2017/0206707 A1 | 7/2017 | Guay et al. |
| 2017/0221119 A1 | 8/2017 | Pellow et al. |
| 2017/0257870 A1 | 9/2017 | Farmanbar et al. |
| 2018/0054772 A1 | 2/2018 | Tan |
| 2018/0060159 A1 | 3/2018 | Justin et al. |
| 2018/0069806 A1 | 3/2018 | Kumar |
| 2018/0152310 A1 | 5/2018 | Ansari et al. |
| 2018/0165386 A1 | 6/2018 | Soundiramourthy et al. |
| 2018/0270079 A1 | 9/2018 | Chamarajnager et al. |
| 2018/0337891 A1 | 11/2018 | Subbarayan et al. |
| 2018/0349121 A1 | 12/2018 | Bagarolo et al. |
| 2018/0357114 A1 | 12/2018 | O'Kennedy et al. |
| 2019/0034199 A1 | 1/2019 | Pollock |
| 2019/0068438 A1 | 2/2019 | Kumar et al. |
| 2020/0050494 A1 * | 2/2020 | Bartfai-Walcott .... G06F 9/5061 |

* cited by examiner (DISTRIBUTED API GATEWAY)

MICROSERVICES APPLICATION NETWORK CONTROL PLANE

CROSS-REFERENCE TO RELATED APPLICATIONS

This application is a divisional of U.S. patent application Ser. No. 17/498,631, filed Oct. 11, 2021, which is a continuation of U.S. patent application Ser. No. 16/714,662, filed Dec. 13, 2019, now U.S. Pat. No. 11,171,842, which claims the benefit of U.S. Provisional Application No. 62/896,412, filed Sep. 5, 2019, which are incorporated by reference herein in their entireties.

TECHNICAL FIELD

The disclosure relates to distributed microservice application networks and more particularly to architecture and data flow between application programming interfaces.

BACKGROUND

Application programming interfaces (APIs) are specifications primarily used as an interface platform by software components to enable communication with each other. For example, APIs can include specifications for clearly defined routines, data structures, object classes, and variables. Thus, an API defines what information is available and how to send or receive that information.

Microservices are a software development technique-a variant of the service-oriented architecture (SOA) architectural style that structures an application as a collection of loosely coupled services (embodied in APIs). In a microservices architecture, services are fine-grained and the protocols are lightweight. The benefit of decomposing an application into different smaller services is that it improves modularity. This makes the application easier to understand, develop, test, and become more resilient to architecture erosion. Microservices parallelize development by enabling small autonomous teams to develop, deploy and scale their respective services independently. Microservice-based architectures enable continuous delivery and deployment.

Setting up multiple APIs is a time-consuming challenge. This is because deploying an API requires tuning the configuration or settings of each API individually. The functionalities of each individual API are confined to that specific API and servers hosting multiple APIs are individually set up for hosting the APIs, this makes it very difficult to build new APIs or even scale and maintain existing APIs. This becomes even more challenging when there are tens of thousands of APIs and millions of clients requesting API-related services per day. Consequently, visualizing these APIs is a tedious and cumbersome activity.

DETAILED DESCRIPTION

Figure 1A:
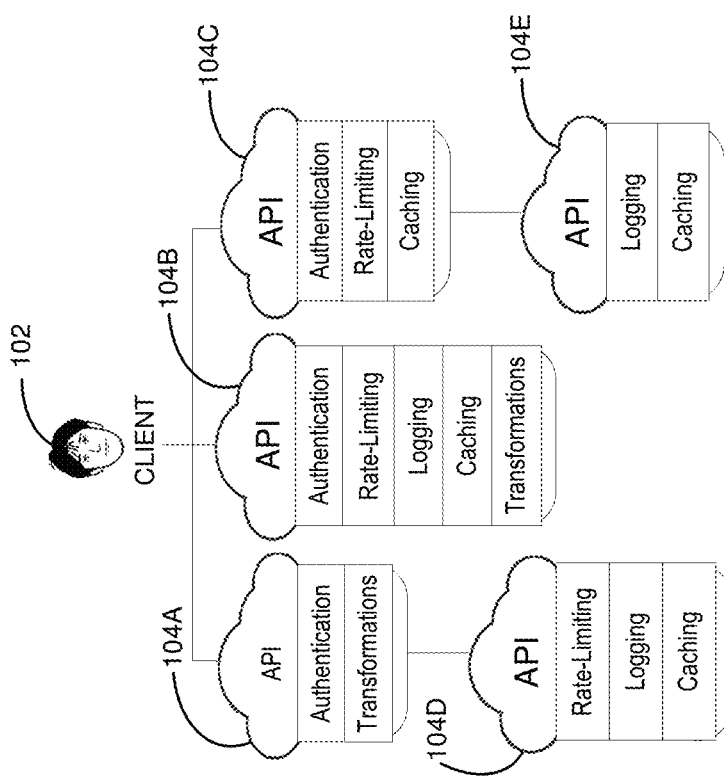
FIG. 1A illustrates a prior art approach with multiple APIs having functionalities common to one another.

The disclosed technology describes how to generate a control plane in a microservices application architecture. In network routing, the control plane is the part of the router architecture that is concerned with drawing the network topology, or the routing table that defines what to do with incoming packets. Control plane logic also can define certain packets to be discarded, as well as preferential treatment of certain packets for which a high quality of service is defined by such mechanisms as differentiated services.

In monolithic application architecture, a control plane operates outside the core application. In a microservices architecture, the control plane operates between each API that makes up the microservice architecture. Proxies operate linked to each API. The proxy attached to each API is referred to as a "data plane proxy." Examples of a data plane proxy include the sidecar proxies of Envoy proxies.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various embodiments given in this specification.

Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure are directed at systems, methods, and architecture for management of microservices APIs that together comprise an application. The architecture is a distributed cluster of gateway nodes that jointly provide. Providing the APIs includes providing a plurality of plugins that implement the APIs. As a result of a distributed architecture, the task of API management can be distributed across a cluster of gateway nodes or even web services. For example, some APIs that make up the microservices application architecture may run on Amazon AWS®, whereas others may operate on Microsoft Azure®. It is feasible that the same API may run multiple instances (e.g., multiple workers) on both AWS and Azure (or any other suitable web hosting service).

The gateway nodes effectively become the entry point for API-related requests from users. Requests that operate in between APIs (e.g., where one API communicates to another API) may have architecturally direct communication, though indicate communications/request response transactions to a control plane via data plane proxies. In some embodiments, inter-API requests may pass through a gateway depending on network topology, API configuration, or stewardship of an associated API. The disclosed embodiments are well-suited for use in mission critical deployments at small and large organizations. Aspects of the disclosed technology do not impose any limitation on the type of APIs. For example, these APIs can be proprietary APIs, publicly available APIs, or invite-only APIs.

FIG. 1A illustrates a prior art approach with multiple APIs having functionalities common to one another. As shown in FIG. 1A, a client 102 is associated with APIs 104A, 104B, 104C, 104D, and 104E. Each API has a standard set of features or functionalities associated with it. For example, the standard set of functionalities associated with API 104A are "authentication" and "transformations." The standard set of functionalities associated with API 104B are "authentication," "rate-limiting," "logging," "caching," and "transformations." Thus, "authentication" and "transformations" are functionalities that are common to APIs 104A and 104B. Similarly, several other APIs in FIG. 1A share common functionalities. However, it is noted that having each API handle its own functionalities individually causes duplication of efforts and code associated with these functionalities, which is inefficient. This problem becomes significantly more challenging when there are tens of thousands of APIs and millions of clients requesting API-related services per day.

Figure 1B:
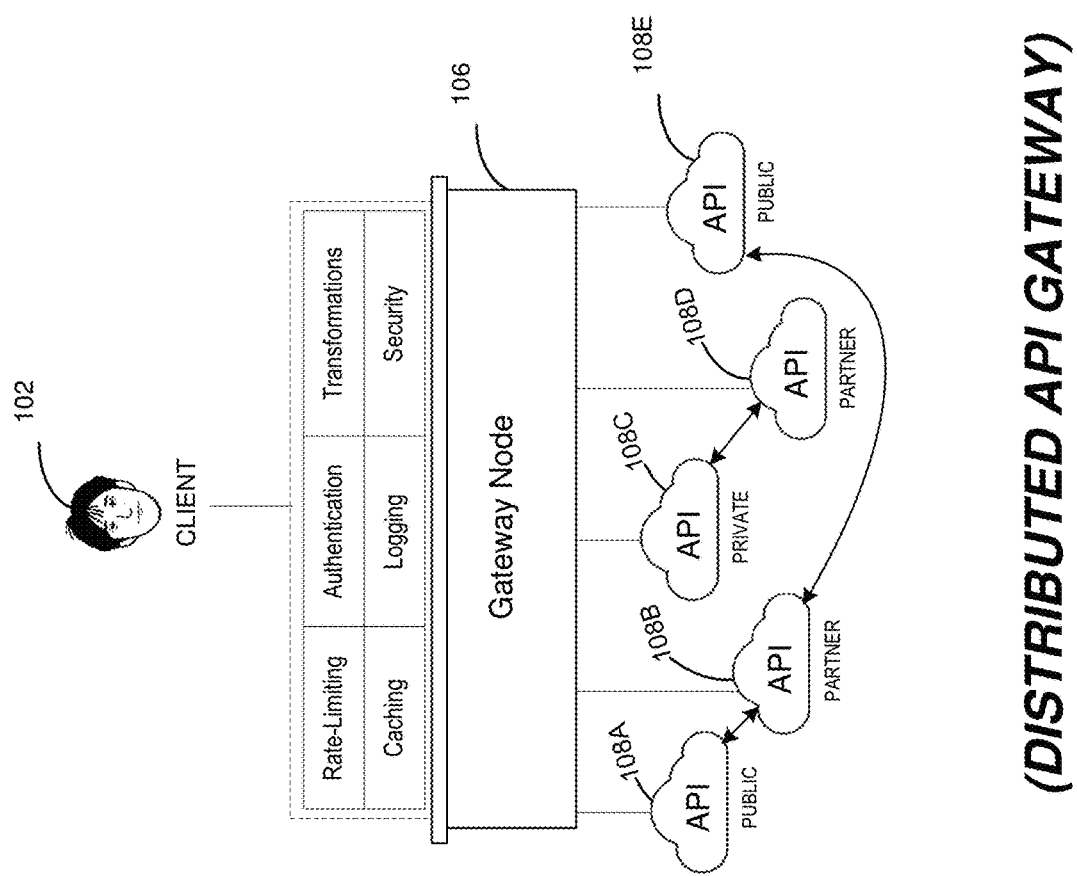
FIG. 1B illustrates a distributed API gateway architecture, according to an embodiment of the disclosed technology.

FIG. 1B illustrates a distributed API gateway architecture according to an embodiment of the disclosed technology. To address the challenge described in connection with FIG. 1A, the disclosed technology provides a distributed API gateway architecture as shown in FIG. 1B. Specifically, disclosed embodiments implement common API functionalities by bundling the common API functionalities into a gateway node 106 (also referred to herein as an API Gateway). Gateway node 106 implements common functionalities as a core set of functionalities that runs in front of APIs 108A, 108B, 108C, 108D, and 108E. The core set of functionalities include rate limiting, caching, authentication, logging, transformations, and security. It will be understood that the above-mentioned core set of functionalities are for examples and illustrations. There can be other functionalities included in the core set of functionalities besides those discussed in FIG. 1B. In some applications, gateway node 106 can help launch large-scale deployments in a very short time at reduced complexity and is therefore an inexpensive replacement for expensive proprietary API management systems. The disclosed technology includes a distributed architecture of gateway nodes with each gateway node bundled with a set of functionalities that can be extended depending on the use-case or applications.

Figure 2:
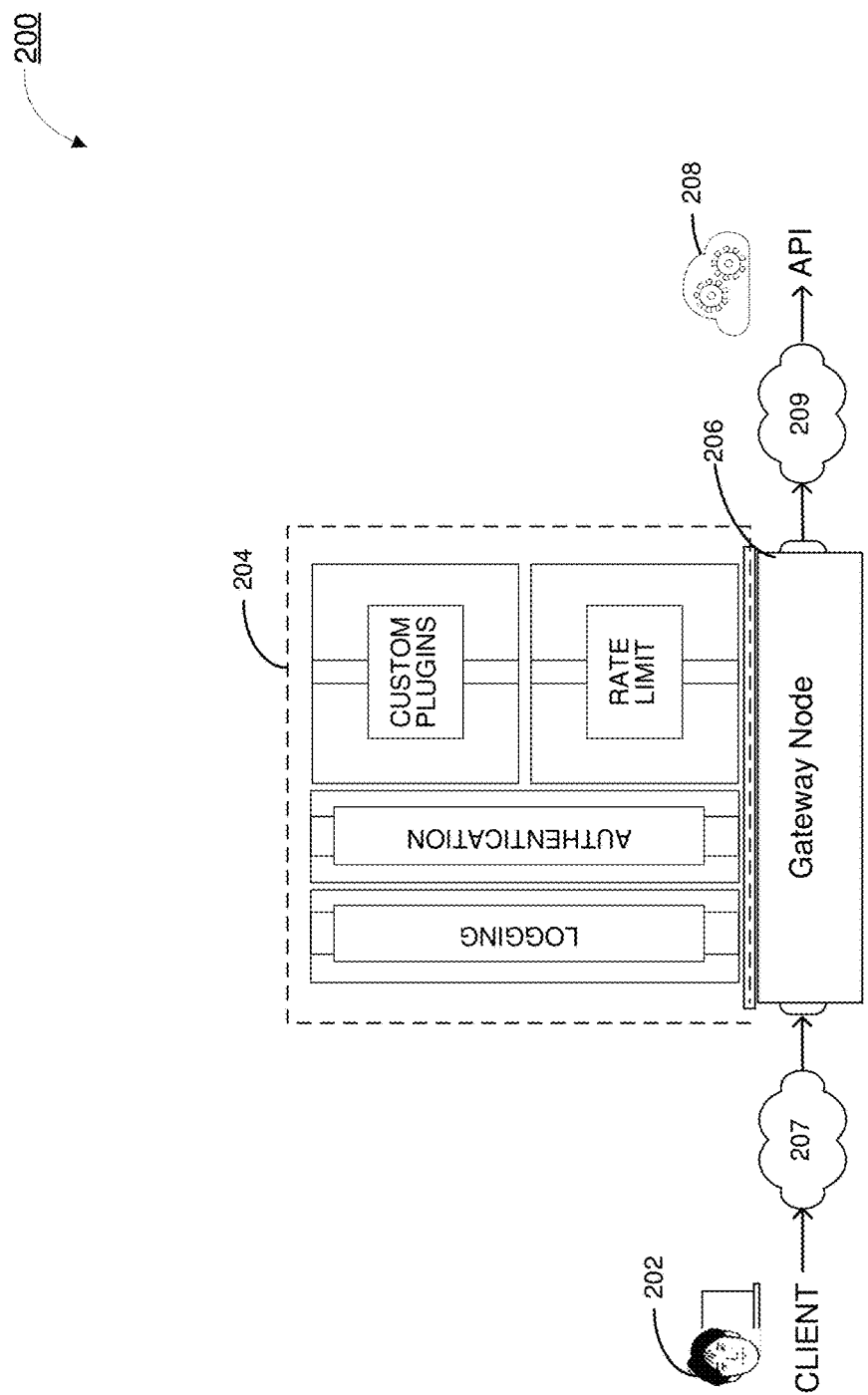
FIG. 2 illustrates a block diagram of an example environment suitable for functionalities provided by a gateway node, according to an embodiment of the disclosed technology.

FIG. 2 illustrates a block diagram of an example environment suitable for functionalities provided by a gateway node according to an embodiment of the disclosed technology. In some embodiments, a core set of functionalities are provided in the form of "plugins" or "add-ons" installed at a gateway node. (Generally, a plugin is a component that allows modification of what a system can do usually without forcing a redesign/compile of the system. When an application supports plug-ins, it enables customization. The common examples are the plug-ins used in web browsers to add new features such as search-engines, virus scanners, or the ability to utilize a new file type such as a new video format.)

As an example, a set of plugins 204 shown in FIG. 2 are provided by gateway node 206 positioned between a client 202 and one or more HTTP APIs. Electronic devices operated by client 202 can include, but are not limited to, a server desktop, a desktop computer, a computer cluster, a mobile computing device such as a notebook, a laptop computer, a handheld computer, a mobile phone, a smart phone, a PDA, and/or an iPhone or Droid device, etc. Gateway node 206 and client 202 are configured to communicate with each other via network 207. Gateway node 206 and one or more APIs 208 are configured to communicate with each other via network 209. In some embodiments, the one or more APIs reside in one or more API servers, API data stores, or one or more API hubs. Various combinations of configurations are possible.

Networks 207 and 209 can be any collection of distinct networks operating wholly or partially in conjunction to provide connectivity to/from client 202 and one or more APIs 208. In one embodiment, network communications can be achieved by, an open network, such as the Internet, or a private network, such as an intranet and/or the extranet. Networks 207 and 209 can be a telephonic network, an open network, such as the Internet, or a private network, such as an intranet and/or the extranet. For example, the Internet can provide file transfer, remote login, email, news, RSS, and other services through any known or convenient protocol, such as, but not limited to the TCP/IP protocol, Open System Interconnections (OSI), FTP, UPnP, iSCSI, NSF, ISDN, PDH, RS-232, SDH, SONET, etc.

Client 202 and one or more APIs 208 can be coupled to the network 150 (e.g., Internet) via a dial-up connection, a digital subscriber loop (DSL, ADSL), cable modem, wireless connections, and/or other types of connection. Thus, the client devices 102A-N, 112A-N, and 122A-N can communicate with remote servers (e.g., API servers 130A-N, hub servers, mail servers, instant messaging servers, etc.) that provide access to user interfaces of the World Wide Web via a web browser, for example.

The set of plugins 204 include authentication, logging, rate-limiting, and custom plugins, of which authentication, logging, traffic control, rate-limiting can be considered as the core set of functionalities. An authentication functionality can allow an authentication plugin to check for valid login credentials such as usernames and passwords. A logging functionality of a logging plugin logs data associated with requests and responses. A traffic control functionality of a traffic control plugin manages, throttles, and restricts inbound and outbound API traffic. A rate limiting functionality can allow managing, throttling, and restricting inbound and outbound API traffic. For example, a rate limiting plugin can determine how many HTTP requests a developer can make in a given period of seconds, minutes, hours, days, months or years.

A plugin can be regarded as a piece of stand-alone code. After a plugin is installed at a gateway node, it is available to be used. For example, gateway node 206 can execute a plugin in between an API-related request and providing an associated response to the API-related request. One advantage of the disclosed system is that the system can be expanded by adding new plugins. In some embodiments, gateway node 206 can expand the core set of functionalities by providing custom plugins. Custom plugins can be provided by the entity that operates the cluster of gateway nodes. In some instances, custom plugins are developed (e.g., built from "scratch") by developers or any user of the disclosed system. It can be appreciated that plugins, used in accordance with the disclosed technology, facilitate in centralizing one or more common functionalities that would be otherwise distributed across the APIs, making it harder to build, scale and maintain the APIs.

Other examples of plugins can be a security plugin, a monitoring and analytics plugin, and a transformation plugin. A security functionality can be associated with the system restricting access to an API by whitelisting or blacklisting/whitelisting one or more consumers identified, for example, in one or more Access Control Lists (ACLs). In some embodiments, the security plugin requires an authentication plugin to be enabled on an API. In some use cases, a request sent by a client can be transformed or altered before being sent to an API. A transformation plugin can apply a transformations functionality to alter the request sent by a client. In many use cases, a client might wish to monitor request and response data. A monitoring and analytics plugin can allow monitoring, visualizing, and inspecting APIs and microservices traffic.

In some embodiments, a plugin is Lua code that is executed during the life-cycle of a proxied request and response. Through plugins, functionalities of a gateway node can be extended to fit any custom need or integration challenge. For example, if a consumer of the disclosed system needs to integrate their API's user authentication with a third-party enterprise security system, it can be implemented in the form of a dedicated (custom) plugin that is run on every request targeting that given API. One advantage, among others, of the disclosed system is that the distributed cluster of gateway nodes is scalable by simply adding more nodes, implying that the system can handle virtually any load while keeping latency low.

One advantage of the disclosed system is that it is platform agnostic, which implies that the system can run anywhere. In one implementation, the distributed cluster can be deployed in multiple data centers of an organization. In some implementations, the distributed cluster can be deployed as multiple nodes in a cloud environment. In some implementations, the distributed cluster can be deployed as a hybrid setup involving physical and cloud computers. In some other implementations, the distributed cluster can be deployed as containers.

Figure 3A:
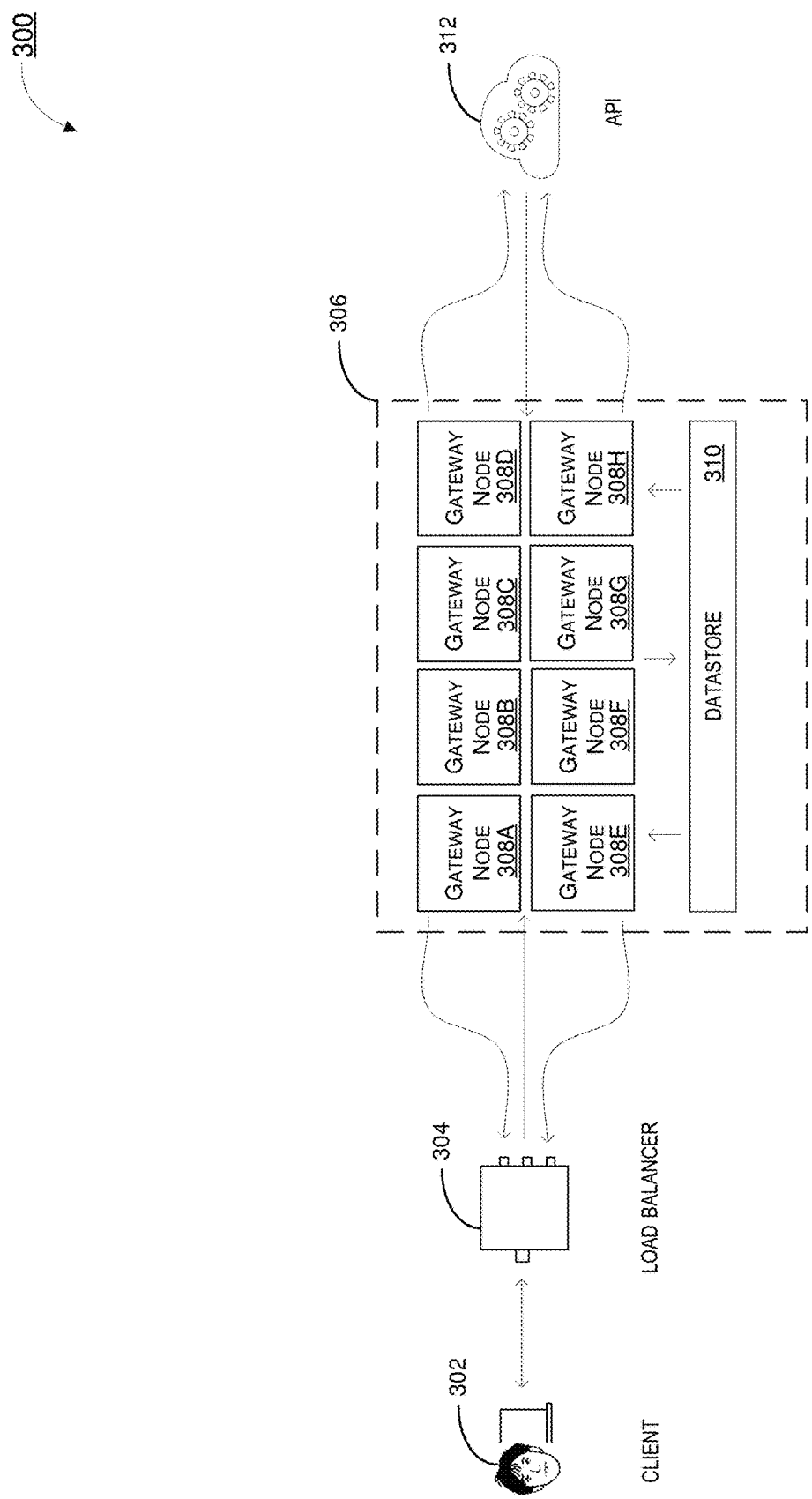
FIG. 3A illustrates a block diagram of an example environment with a cluster of gateway nodes in operation, according to an embodiment of the disclosed technology.

FIG. 3A illustrates a block diagram of an example environment with a cluster of gateway nodes in operation. In some embodiments, a gateway node is built on top of NGINX. NGINX is a high-performance, highly-scalable, highly-available web server, reverse proxy server, and web accelerator (combining the features of an HTTP load balancer, content cache, and other features). In an example deployment, a client 302 communicates with one or more APIs 312 via load balancer 304, and a cluster of gateway nodes 306. The cluster of gateway nodes 306 can be a distributed cluster. The cluster of gateway nodes 306 includes gateway nodes 308A-308H and data store 310. The functions represented by the gateway nodes 308A-308H and/or the data store 310 can be implemented individually or in any combination thereof, partially or wholly, in hardware, software, or a combination of hardware and software.

Load balancer 304 provides functionalities for load balancing requests to multiple backend services. In some embodiments, load balancer 304 can be an external load balancer. In some embodiments, the load balancer 304 can be a DNS-based load balancer. In some embodiments, the load balancer 304 can be a Kubernetes® load balancer integrated within the cluster of gateway nodes 306.

Data store 310 stores all the data, routing information, plugin configurations, etc. Examples of a data store can be Apache Cassandra or PostgreSQL. In accordance with disclosed embodiments, multiple gateway nodes in the cluster share the same data store, e.g., as shown in FIG. 3A. Because multiple gateway nodes in the cluster share the same data store, there is no requirement to associate a specific gateway node with the data store—data from each gateway node 308A-308H is stored in data store 310 and retrieved by the other nodes (e.g., even in complex multiple data center setups). In some embodiments, the data store shares configurations and software codes associated with a plugin that is installed at a gateway node. In some embodiments, the plugin configuration and code can be loaded at runtime.

Figure 3B:
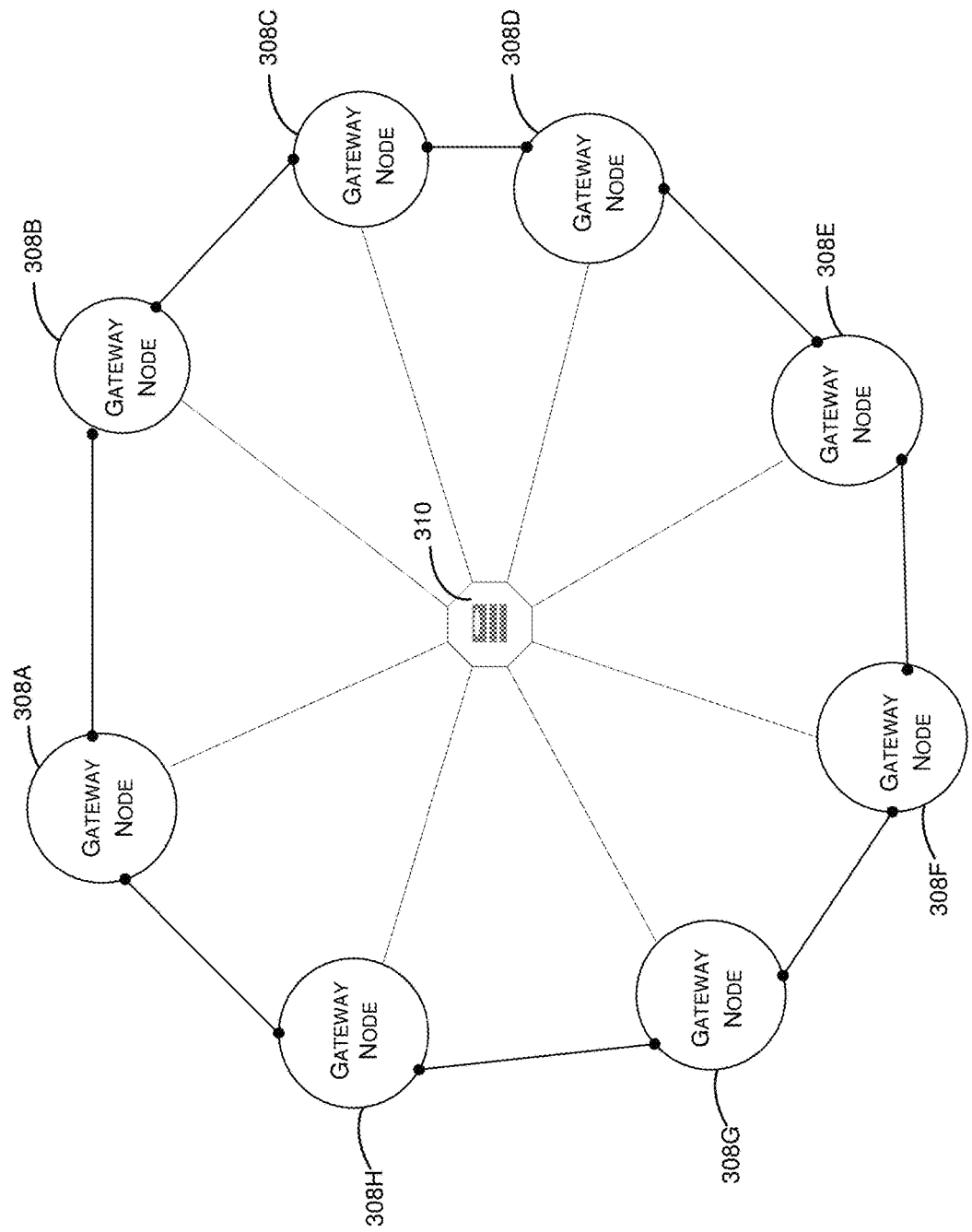
FIG. 3B illustrates a schematic of a data store shared by multiple gateway nodes, according to an embodiment of the disclosed technology.

FIG. 3B illustrates a schematic of a data store shared by multiple gateway nodes, according to an embodiment of the disclosed technology. For example, FIG. 3B shows data store 310 shared by gateway nodes 308A-308H arranged as part of a cluster.

One advantage of the disclosed architecture is that the cluster of gateway nodes allow the system to be scaled horizontally by adding more gateway nodes to encompass a bigger load of incoming API-related requests. Each of the gateway nodes share the same data since they point to the same data store. The cluster of gateway nodes can be created in one datacenter, or in multiple datacenters distributed across different geographical locations, in both cloud or on-premise environments. In some embodiments, gateway nodes (e.g., arranged according to a flat network topology)

between the datacenters communicate over a Virtual Private Network (VPN) connection. The system can automatically handle a new gateway node joining a cluster or leaving a cluster. Once a gateway node communicates with another gateway node, it will automatically discover all the other gateway nodes due to an underlying gossip protocol.

In some embodiments, each gateway includes an administration API (e.g., internal RESTful API) for administration purposes. Requests to the administration API can be sent to any node in the cluster. The administration API can be a generic HTTP API. Upon set up, each gateway node is associated with a consumer port and an admin port that manages the API-related requests coming into the consumer port. For example, port number 8001 is the default port on which the administration API listens and 8444 is the default port for HTTPS (e.g., admin _listen_ssl) traffic to the administration API.

In some instances, the administration API can be used to provision plugins. After a plugin is installed at a gateway node, it is available to be used, e.g., by the administration API or a declarative configuration.

In some embodiments, the administration API identifies a status of a cluster based on a health state of each gateway node. For example, a gateway node can be in one of the following states:
  active: the node is active and part of the cluster.
  failed: the node is not reachable by the cluster.
  leaving: a node is in the process of leaving the cluster.
  left: the node has left the cluster.

In some embodiments, the administration API is an HTTP API available on each gateway node that allows the user to create, restore, update, and delete (CRUD) operations on items (e.g., plugins) stored in the data store. For example, the Admin API can provision APIs on a gateway node, provision plugin configuration, create consumers, and provision their credentials. In some embodiments, the administration API can also read, update, or delete the data. Generally, the administration API can configure a gateway node and the data associated with the gateway node in the data store.

In some applications, it is possible that the data store only stores the configuration of a plugin and not the software code of the plugin. That is, for installing a plugin at a gateway node, the software code of the plugin is stored on that gateway node. This can result in inefficiencies because the user needs to update his or her deployment scripts to include the new instructions that would install the plugin at every gateway node. The disclosed technology addresses this issue by storing both the plugin and the configuration of the plugin. By leveraging the administration API, each gateway node can not only configure the plugins, but also install them. Thus, one advantage of the disclosed system is that a user does not have to install plugins at every gateway node. But rather, the administration API associated with one of the gateway nodes automates the task of installing the plugins at gateway nodes by installing the plugin in the shared data store, such that every gateway node can retrieve the plugin code and execute the code for installing the plugins. Because the plugin code is also saved in the shared data store, the code is effectively shared across the gateway nodes by leveraging the data store, and does not have to be individually installed on every gateway node.

Figure 4A:
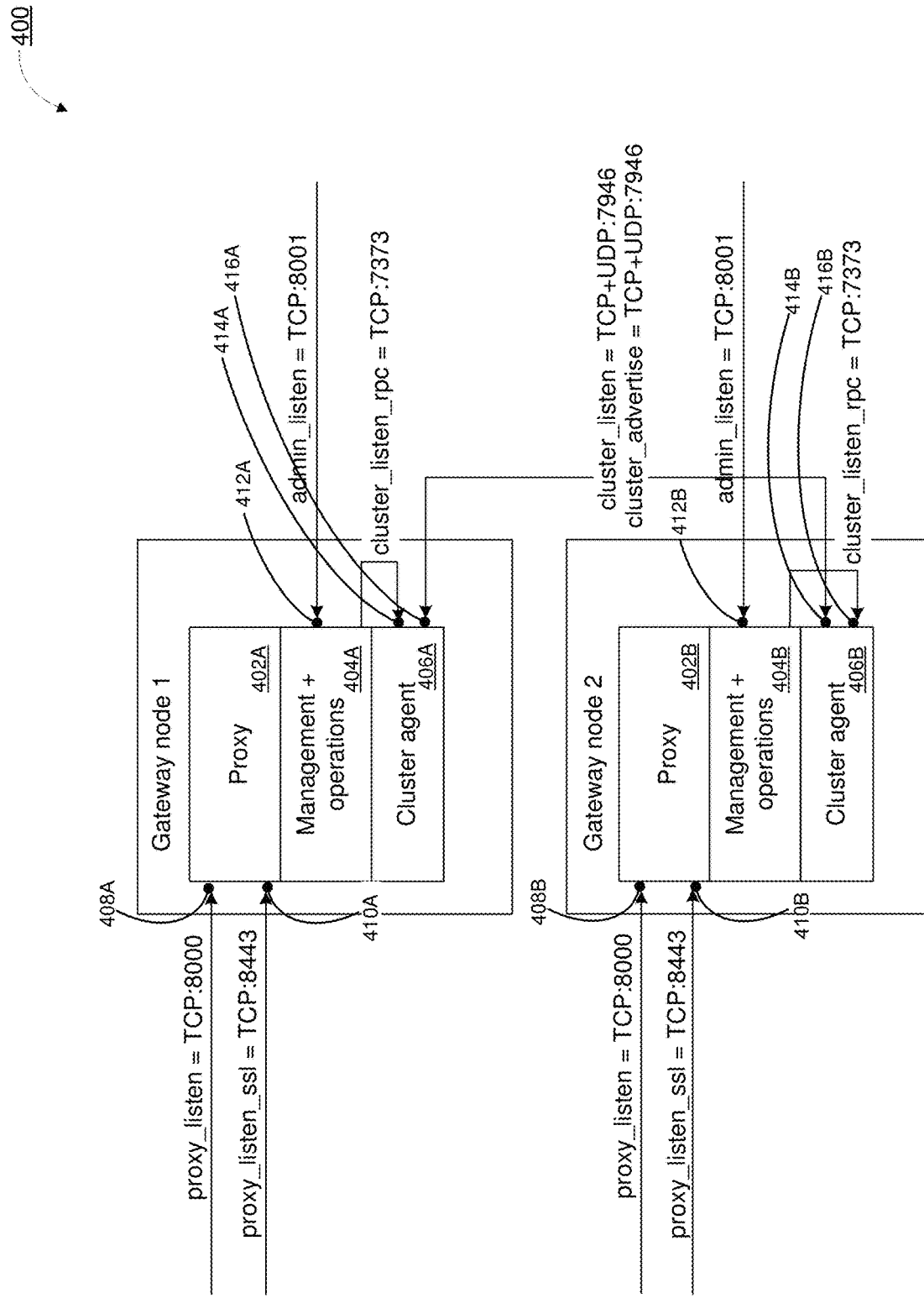
FIG. 4A and FIG. 4B illustrate example ports and connections of a gateway node, according to an embodiment of the disclosed technology.
Figure 4B:
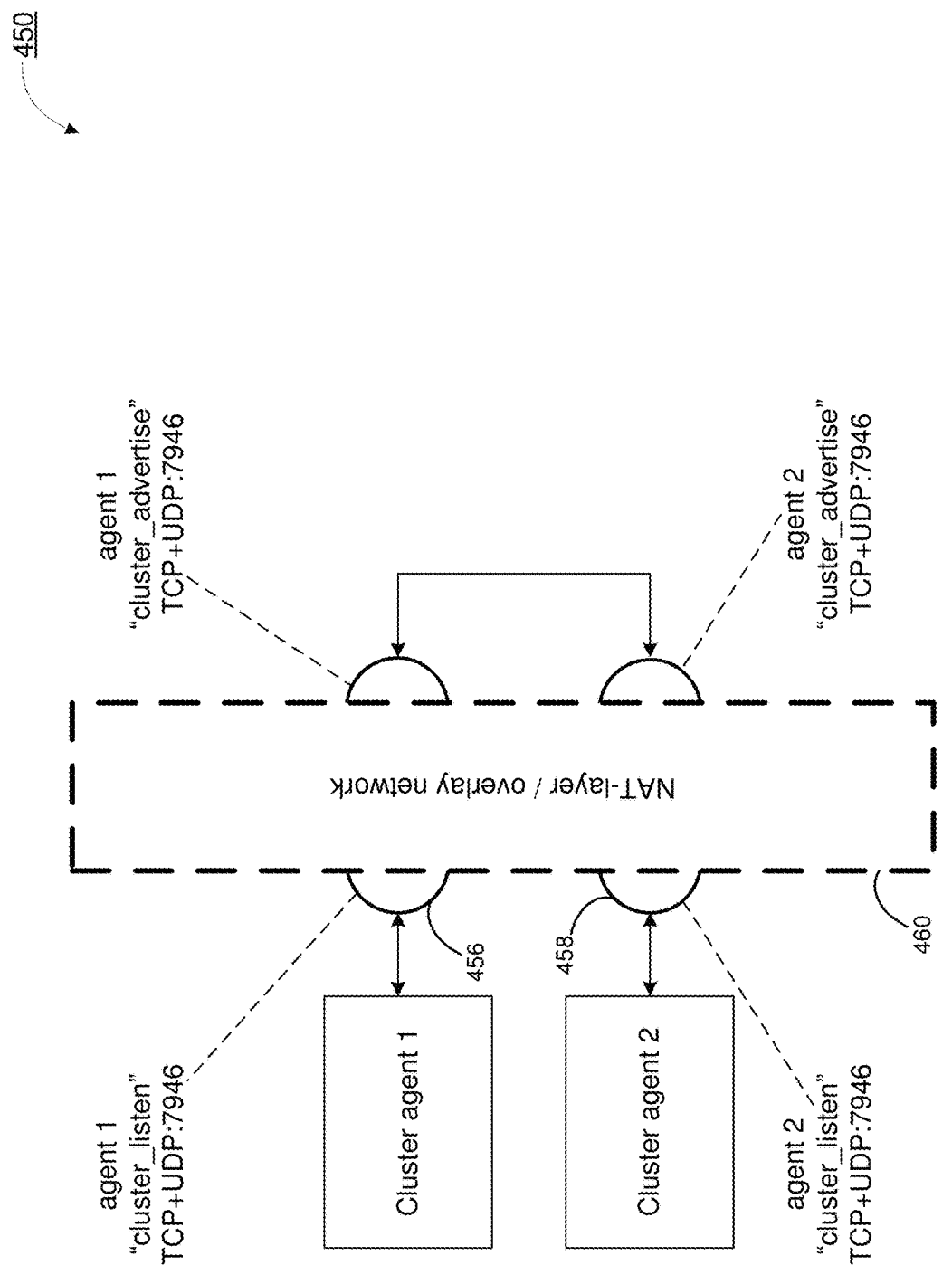

FIG. 4A and FIG. 4B illustrate example block diagrams 400 and 450 showing ports and connections of a gateway node, according to an embodiment of the disclosed technology. Specifically, FIG. 4A shows a gateway node 1 and gateway node 2. Gateway node 1 includes a proxy module 402A, a management and operations module 404A, and a cluster agent module 406A. Gateway node 2 includes a proxy module 402B, a management and operations module 404B, and a cluster agent module 406B. Gateway node 1 receive incoming traffic at ports denoted as 408A and 410A. Ports 408A and 410A are coupled to proxy module 402B. Gateway node 1 listens for HTTP traffic at port 408A. The default port number for port 408A is 8000. API-related requests are typically received at port 408A. Port 410A is used for proxying HTTPS traffic. The default port number for port 410A is 8443. Gateway node 1 exposes its administration API (alternatively, referred to as management API) at port 412A that is coupled to management and operations module 404A. The default port number for port 412A is 8001. The administration API allows configuration and management of a gateway node, and is typically kept private and secured. Gateway node 1 allows communication within itself (i.e., intra-node communication) via port 414A that is coupled to clustering agent module 406A. The default port number for port 414A is 7373. Because the traffic (e.g., TCP traffic) here is local to a gateway node, this traffic does not need to be exposed. Cluster agent module 406B of gateway node 1 enables communication between gateway node 1 and other gateway nodes in the cluster. For example, ports 416A and 416B coupled with cluster agent module 406A at gateway node 1 and cluster agent module 406B at gateway node 2 allow intra-cluster or inter-node communication. Intra-cluster communication can involve UDP and TCP traffic. Both ports 416A and 416B have the default port number set to 7946. In some embodiments, a gateway node automatically (e.g., without human intervention) detects its ports and addresses. In some embodiments, the ports and addresses are advertised (e.g., by setting the cluster_advertise property/setting to a port number) to other gateway nodes. It will be understood that the connections and ports (denoted with the numeral "B") of gateway node 2 are similar to those in gateway node 1, and hence is not discussed herein.

FIG. 4B shows cluster agent 1 coupled to port 456 and cluster agent 2 coupled to port 458. Cluster agent 1 and cluster agent 2 are associated with gateway node 1 and gateway node 2 respectively. Ports 456 and 458 are communicatively connected to one another via a NAT-layer 460. In accordance with disclosed embodiments, gateway nodes are communicatively connected to one another via a NAT-layer. In some embodiments, there is no separate cluster agent but the functionalities of the cluster agent are integrated into the gateway nodes. In some embodiments, gateway nodes communicate with each other using the explicit IP address of the nodes.

Figure 5:
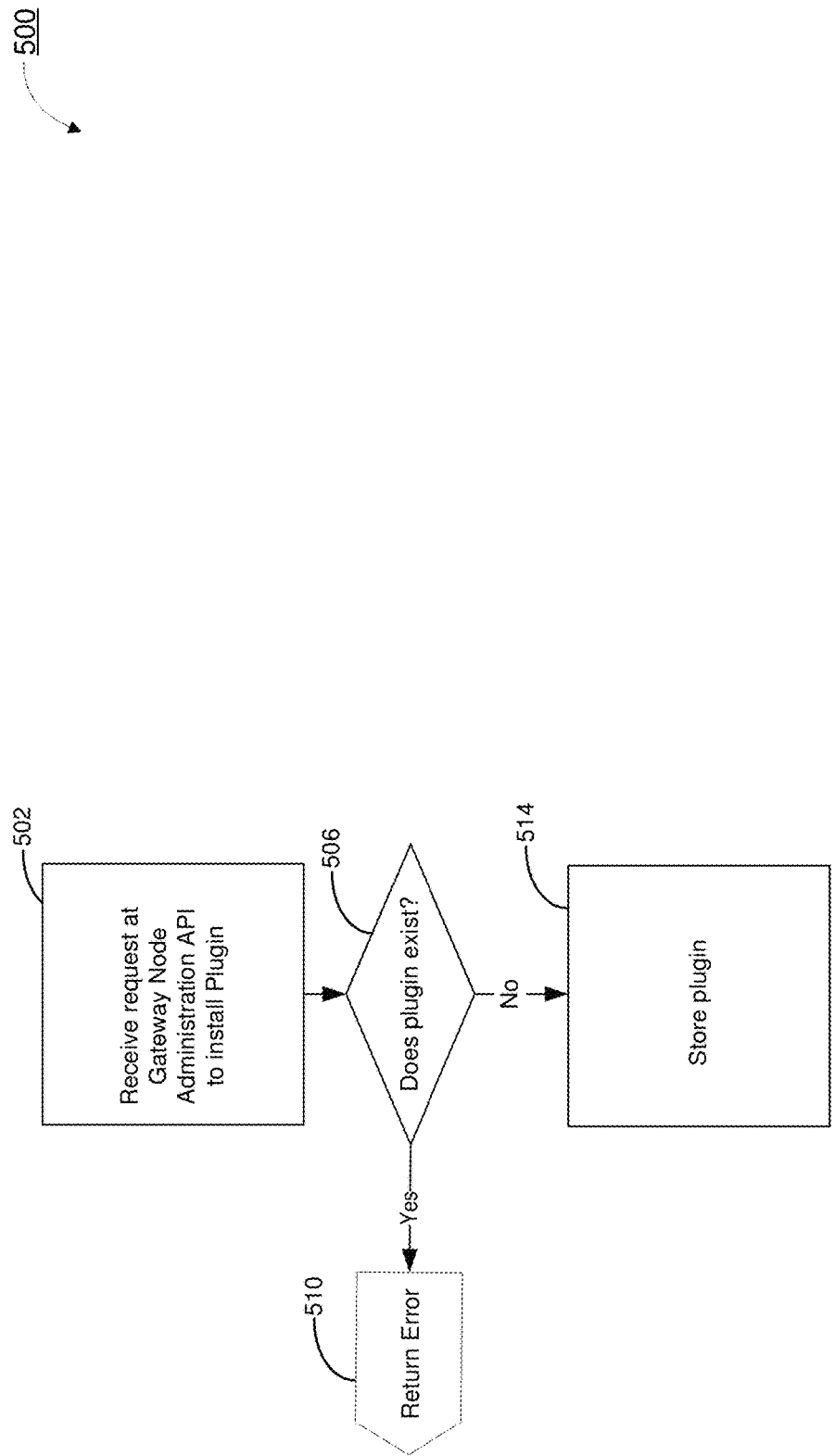
FIG. 5 illustrates a flow diagram showing steps involved in the installation of a plugin at a gateway node, according to an embodiment of the disclosed technology.

FIG. 5 illustrates a flow diagram showing steps of a process 500 involved in installation of a plugin at a gateway node, according to an embodiment of the disclosed technology. At step 502, the administration API of a gateway node receives a request to install a plugin. An example of a request is provided below:
  For example:
  POST/plugins/install
  name=OPTIONAL_VALUE
  code=VALUE
  archive=VALUE The administration API of the gateway node determines (at step 506) if the plugin exists in the data store. If the gateway node determines that the plugin exists in the data store, then the process returns (step 510) an error. If the gateway node determines that the plugin does not exist in the data store, then the process stores the plugin. (In some embodiments, the plugin can be stored in an external data store coupled to the gateway node, a local cache of the gateway node, or a third-party storage. For example, if the plugin is stored at some other location besides the data store, then different policies can be implemented for accessing the plugin.) Because the plugin is now stored in the database, it is ready to be used by any gateway node in the cluster.

When a new API request goes through a gateway node (in the form of network packets), the gateway node determines (among other things) which plugins are to be loaded. Therefore, a gateway node sends a request to the data store to retrieve the plugin(s) that has/have been configured on the API and that need(s) to be executed. The gateway node communicates with the data store using the appropriate database driver (e.g., Cassandra or PostgresSQL) over a TCP communication. In some embodiments, the gateway node retrieves both the plugin code to execute and the plugin configuration to apply for the API, and then execute them at runtime on the gateway node (e.g., as explained in FIG. 6).

Figure 6:
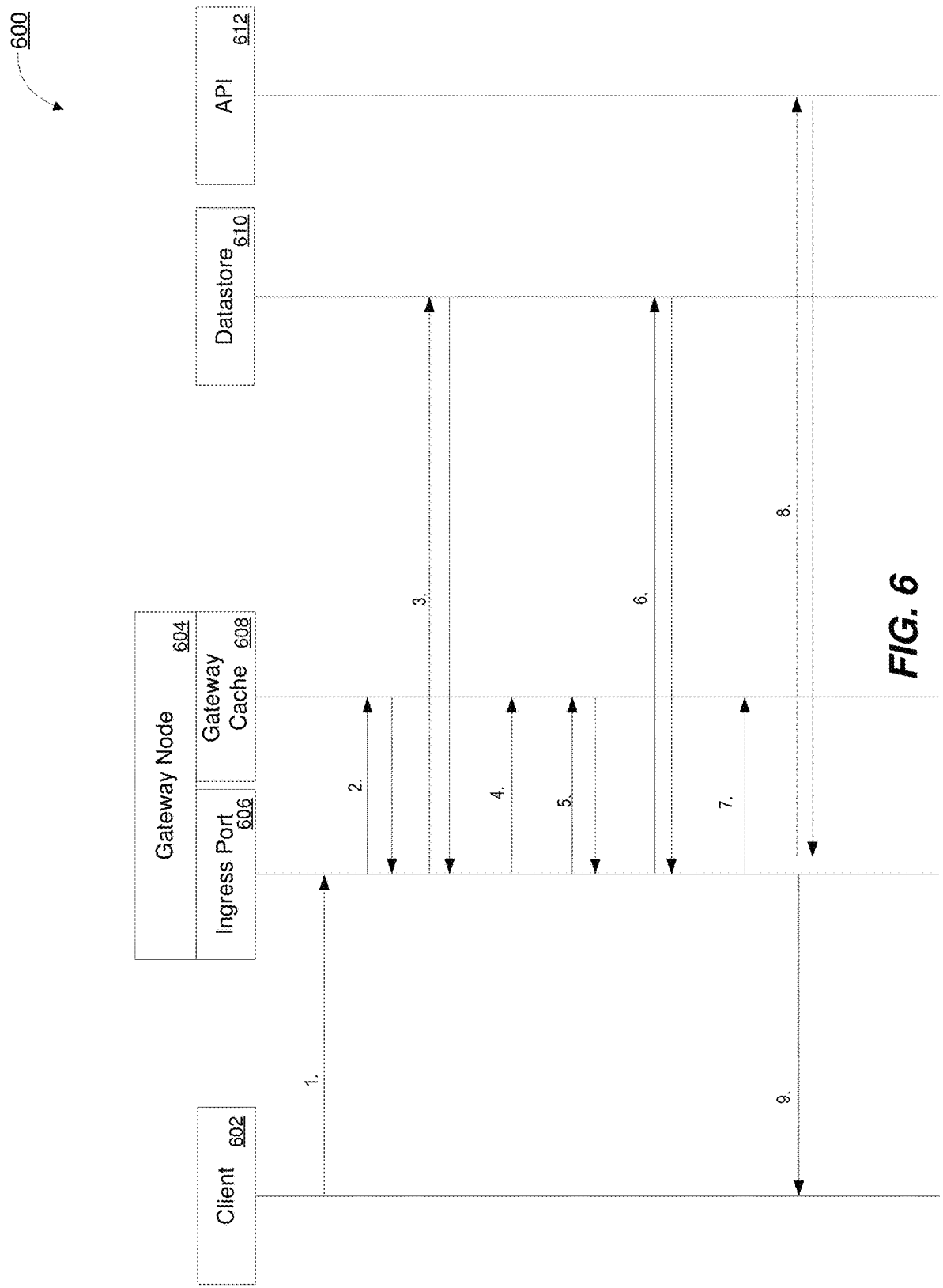
FIG. 6 illustrates a sequence diagram showing components and associated steps involved in loading configurations and code at runtime, according to an embodiment of the disclosed technology.

FIG. 6 illustrates a sequence diagram 600 showing components and associated steps involved in loading configurations and code at runtime, according to an embodiment of the disclosed technology. The components involved in the interaction are client 602, gateway node 604 (including an ingress port 606 and a gateway cache 608), data store 610, and an API 612. At step 1, a client makes a request to gateway node 604. At step 2, ingress port 606 of gateway node 604 checks with gateway cache 608 to determine if the plugin information and the information to process the request has already been cached previously in gateway cache 608. If the plugin information and the information to process the request is cached in gateway cache 608, then the gateway cache 608 provides such information to the ingress port 606. If, however, the gateway cache 608 informs the ingress port 606 that the plugin information and the information to process the request is not cached in gateway cache 608, then the ingress port 606 loads (at step 3) the plugin information and the information to process the request from data store 610. In some embodiments, ingress port 606 caches (for subsequent requests) the plugin information and the information to process the request (retrieved from data store 610) at gateway cache 608. At step 5, ingress port 606 of gateway node 604 executes the plugin and retrieves the plugin code from the cache, for each plugin configuration. However, if the plugin code is not cached at the gateway cache 608, the gateway node 604 retrieves (at step 6) the plugin code from data store 610 and caches (step 7) it at gateway cache 608. The gateway node 604 executes the plugins for the request and the response (e.g., by proxy the request to API 612 at step 7), and at step 8, the gateway node 604 returns a final response to the client.

Figure 7:
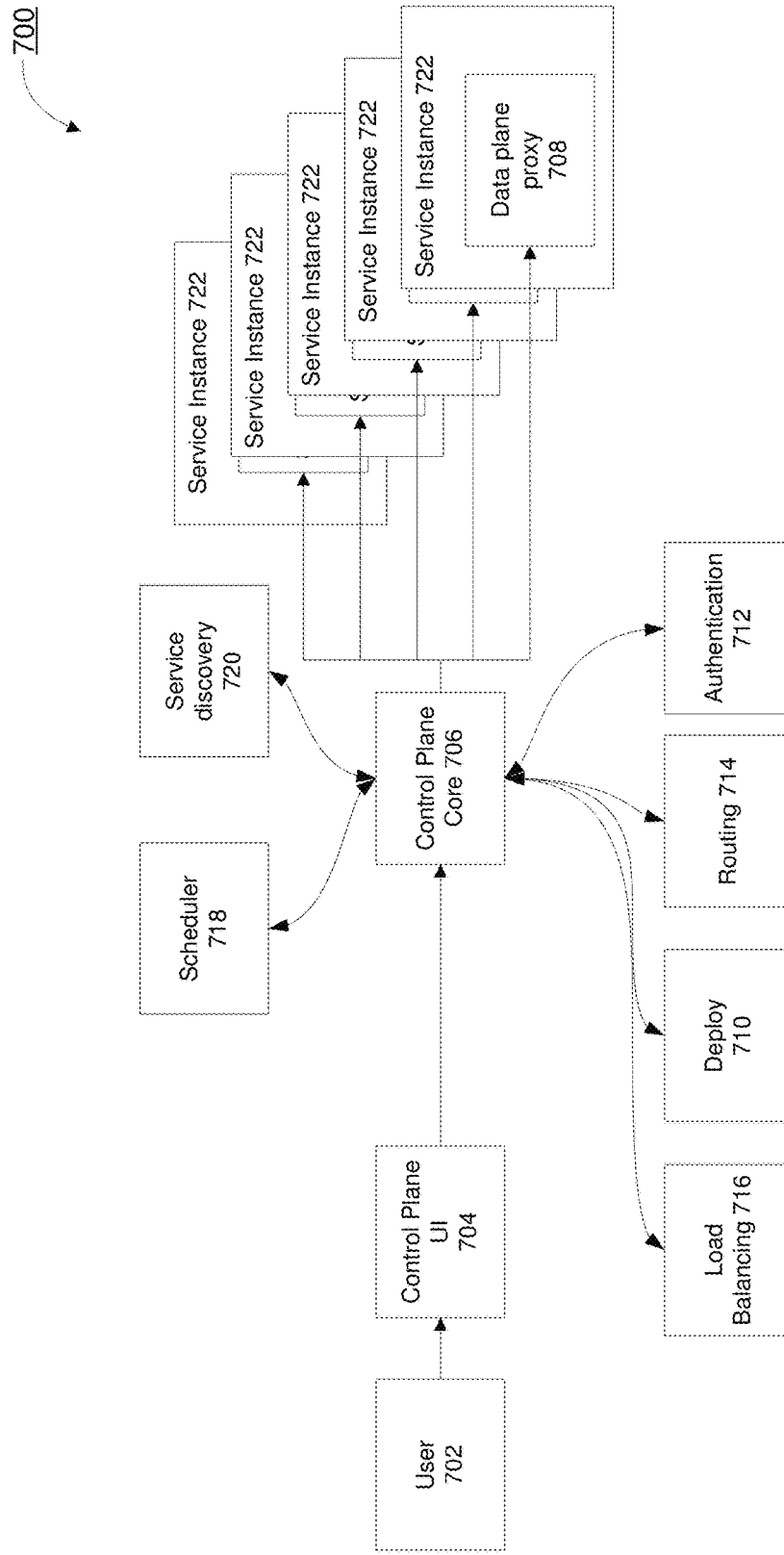
FIG. 7 is a block diagram of a control plane system for a service mesh in a microservices architecture

FIG. 7 is a block diagram of a control plane system 700 for a service mesh in a microservices architecture. A service mesh data plane is controlled by a control plane. In a microservices architecture, each microservice typically exposes a set of what are typically fine-grained endpoints, as opposed to a monolithic application where there is just one set of (typically replicated, load-balanced) endpoints. An endpoint can be considered to be a URL pattern used to communicate with an API.

Service mesh data plane: Touches every packet/request in the system. Responsible for service discovery, health checking, routing, load balancing, authentication/authorization, and observability.

Service mesh control plane: Provides policy and configuration for all of the running data planes in the mesh. Does not touch any packets/requests in the system but collects the packets in the system. The control plane turns all the data planes into a distributed system.

A service mesh such as Linkerd, NGINX, HAProxy, Envoy co-locate service instances with a data plane proxy network proxy. Network traffic (HTTP, REST, gRPC, Redis, etc.) from an individual service instance flows via its local data plane proxy to the appropriate destination. Thus, the service instance is not aware of the network at large and only knows about its local proxy. In effect, the distributed system network has been abstracted away from the service programmer. In a service mesh, the data plane proxy performs a number of tasks. Example tasks include service discovery, health checking, routing, load balancing, authentication and authorization, and observability.

Service discovery identifies each of the upstream/backend microservice instances within used by the relevant application. Health checking refers to detection of whether upstream service instances returned by service discovery are ready to accept network traffic. The detection may include both active (e.g., out-of-band pings to an endpoint) and passive (e.g., using 3 consecutive 5xx as an indication of an unhealthy state) health checking. The service mesh is further configured to route requests from local service instances to desired upstream service clusters.

Load balancing: Once an upstream service cluster has been selected during routing, a service mesh is configured load balance. Load balancing includes determining which upstream service instance should the request be sent; with what timeout; with what circuit breaking settings; and if the request fails should it be retried?

The service mesh further authenticates and authorizes incoming requests cryptographically using mTLS or some other mechanism. Data plane proxies enable observability features including detailed statistics, logging, and distributed tracing data should be generated so that operators can understand distributed traffic flow and debug problems as they occur.

In effect, the data plane proxy is the data plane. Said another way, the data plane is responsible for conditionally translating, forwarding, and observing every network packet that flows to and from a service instance.

The network abstraction that the data plane proxy provides does not inherently include instructions or built in methods to control the associated service instances in any of the ways described above. The control features are the enabled by a control plane. The control plane takes a set of isolated stateless data plane proxies and turns them into a distributed system.

A service mesh and control plane system 700 includes a user 702 whom interfaces with a control plane UI 704. The UI 704 might be a web portal, a CLI, or some other interface. Through the UI 704, the user 702 has access to the control plane core 706. The control plane core 706 serves as a central point that other control plane services operate through in connection with the data plane proxies 708. Ultimately, the goal of a control plane is to set policy that will eventually be enacted by the data plane. More advanced control planes will abstract more of the system from the operator and require less handholding.

control plane services may include global system configuration settings such as deploy control 710 (blue/green and/or traffic shifting), authentication and authorization settings 712, route table specification 714 (e.g., when service A requests a command, what happens), load balancer settings 716 (e.g., timeouts, retries, circuit breakers, etc.), a workload scheduler 718, and a service discovery system 720. The scheduler 718 is responsible for bootstrapping a service along with its data plane proxy 718. Services 722 are run on an infrastructure via some type of scheduling system (e.g., Kubernetes or Nomad). Typical control planes operate in control of control plane services 710-720 that in turn control the data plane proxies 708. Thus, in typical examples, the control plane services 710-720 are intermediaries to the services 722 and associated data plane proxies 708.

As depicted in FIG. 7, the control plane core 706 is the intermediary between the control plane services 710-720 and the data plane proxies 708. Acting as the intermediary, the control plane core 706 removes dependencies that exist in other control plane systems and enables the control plane core 706 to be platform agnostic. The control plane services 710-720 act as managed stores. With managed storages in a cloud deployment, scaling and maintaining the control plane core 706 involves fewer updates. The control plane core 706 can be split to multiple modules during implementation.

The control plane core 706 passively monitors each service instance 722 via the data plane proxies 708 via live traffic. However, the control plane core 706 may take active checks to determine the status or health of the overall application.

The control plane core 706 supports multiple control plane services 710-720 at the same time by defining which one is more important through priorities. Employing a control plane core 706 as disclosed aids control plane service 710-720 migration. Where a user wishes to change the control plane service provider (ex: changing service discovery between Zookeeper based discovery to switch to Consul based discovery), a control plane core 706 that receives the output of the control plane services 710-720 from various providers can configure each regardless of provider. Conversely, a control plane that merely directs control plane services 710-720 includes no such configuration store.

Another feature provided by the control plane core 706 is Static service addition. For example, a user may run Consul, but you want to add another service/instance (ex: for debugging). The user may not want to add the additional service on the Consul cluster. Using a control plane core 706, the user may plug the file-based source with custom definition multi-datacenter support. The user may expose the state hold in control plane core 706 as HTTP endpoint, plug the control plane core 706 from other datacenters as a source with lower priority. This will provide fallback for instances in the other datacenters when instances from local datacenter are unavailable.

Service Group Discovery and Observation

Figure 8:
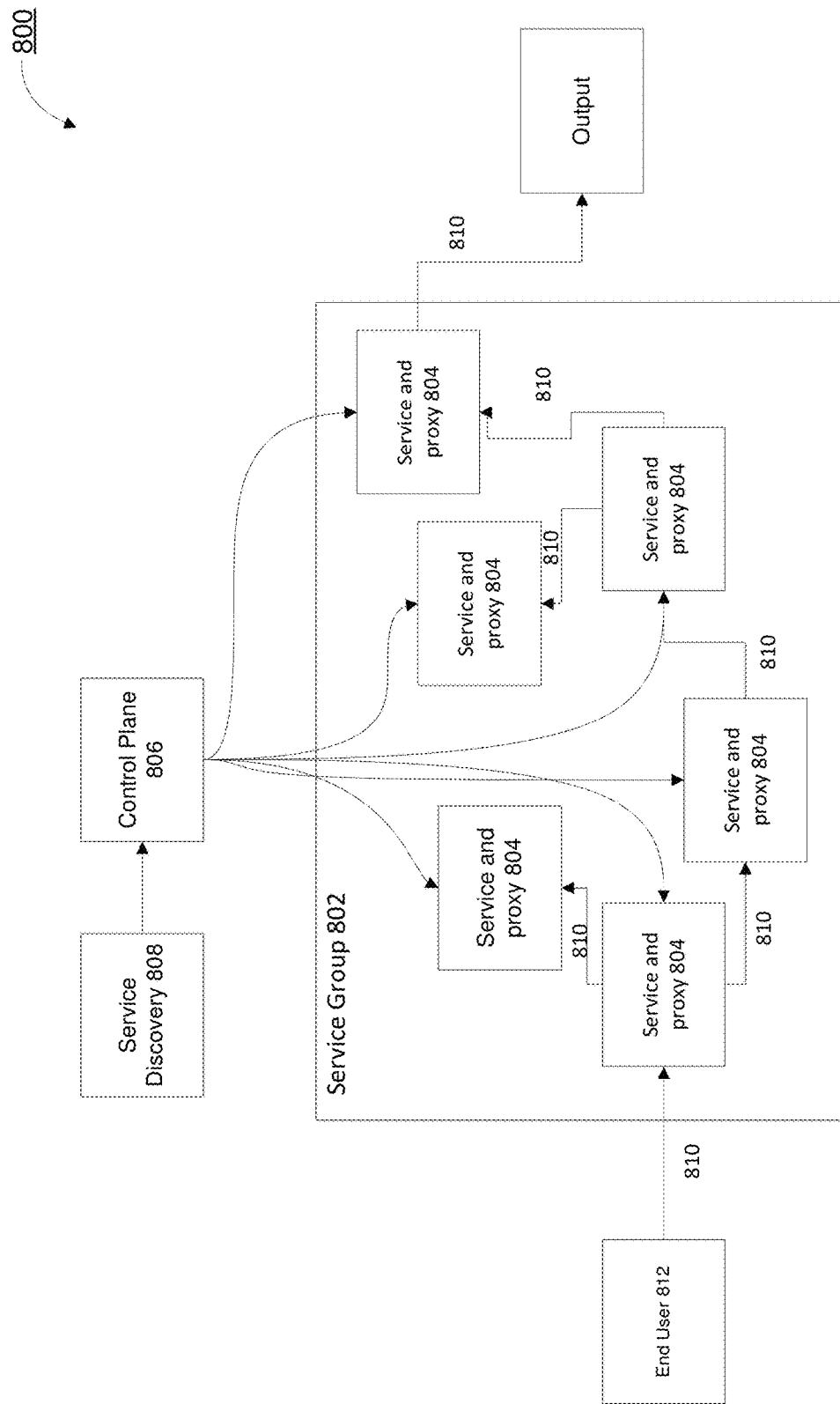
FIG. 8 is a block diagram illustrating service groups and features associated with identification thereof

FIG. 8 is a block diagram illustrating service groups 802 and features associated with identification thereof. A service group 802 is a group of services 804 that together perform an identifiable application purpose or business flow. For example, a set of microservices are responsible for an airline's ticketing portion of their website. Other examples may include "customer experience," "sign up," "login," "payment processing", etc. Using a control plane 806 with an associated service discovery 808 feature, packets are be monitored as they filter through the overall application (ex: whole website).

Given a starting point of a given service group 802, the control plane 806 may run a trace on packets having a known ID and follow where those packets (with the known ID) go in the microservice architecture as tracked by data plane proxies. In that way, the system can then automatically populate a service group 802 using the trace. The trace is enabled via the shared execution path of the data plane proxies. Along each step 810 between services 804, the control plane 804 measures latency and discover services. The trace may operate on live traffic corresponding to end users 812, or alternatively using test traffic.

As output, the control plane generates a dependency graph of the given service group 802 business flow and reports via a GUI. Using the dependency graph, a backend operator is provided insight into bottlenecks in the service group 802. For example, in a given service group 802, a set of services 804 may run on multiple servers that are operated by different companies (e.g., AWS, Azure, Google Cloud, etc.). The latency between these servers may slow down the service group 802 as a whole. Greater observability into the service group 802 via a dependency graph enables backend operators to improve the capabilities and throughput of the service group 802.

Figure 9:
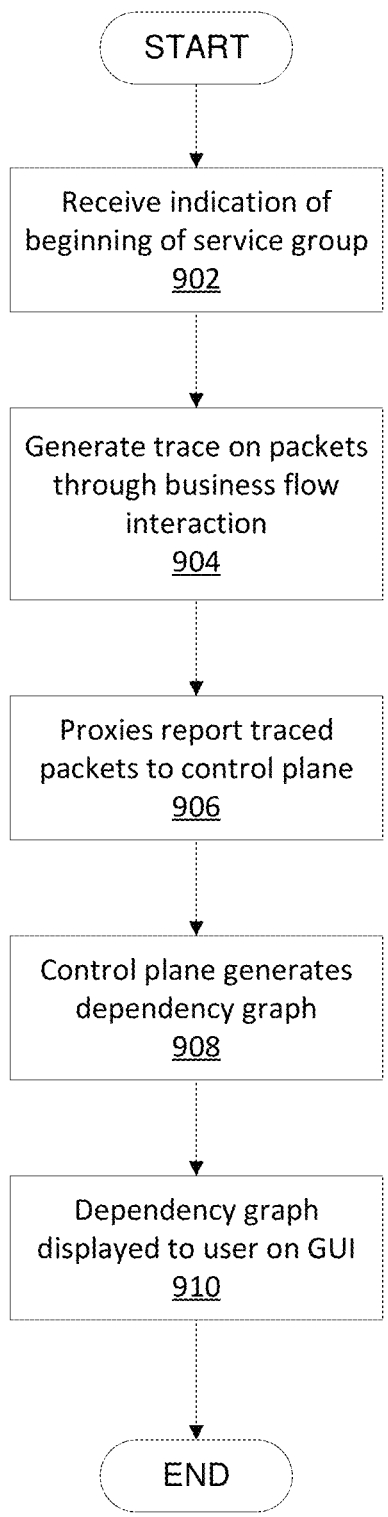
FIG. 9 is a flowchart illustrating a method of generating a service group dependency graph.

FIG. 9 is a flowchart illustrating a method of generating a service group dependency graph. In step 902, the control plane receives an indication of the beginning of a service group. An example of the start of a service group is a service where a user first interacts with a given business flow. In step 904, the control plane generates a trace on a given interaction beginning at the start of the service group. In some embodiments, multiple interactions with the service group are used. Multiple interactions provide additional visibility especially when the given business flow associated with the service group has variable outcomes. The trace uses a particular ID of packets within the execution path.

In step 906, the data plane proxies follow packets related to the trace and report statistics to the control plane. The data plane proxies that are used in the given service group report while other proxies associated with services not associated with the service group do not report. The reports include timestamps, that when compared enable the control plane to derive latency between each service in the service group. In step 908, the control plane generates a dependency graph based on reports by data plane proxies. In step 910, the dependency graph is displayed to an administrative user of the control plane.

Self-Healing Architecture

In a microservices architecture, where a large number of API services interoperate, it is very difficult for a human to investigate and untangle the interrelations between services and identify issues. As applications become more complex and decoupled, the difficulty increases for human architects to make the right decisions when application performance degrades. Traditionally, application issues or anomalies are recorded in a logging solution, an alert would be triggered for a human architect. Subsequently, the human architect must find out where in the source of the problem in the application, what caused the problem and then put into action a solution to fix the problem. For example, if an unexpected problem has been introduced by the rollout of a new version of a component that the application depends upon, a solution would be to roll back the requests to the previous working version of the same component.

Self-healing, or intelligent healing, of the application makes use of the data plane proxies to collect real-time status about requests associated API services are processing, including (but not limited to) request rate, latency, errors. By leveraging this information, the data plane can determine if an API or service that's being consumed (or that's consuming a third-party service) is healthy or not and communicate the health status to the control plane. The control plane, having data received from multiple data plane proxies, is aware of the health status of the entire application and therefore of all the services, components and APIs that are being provided by the application and consumed by the application.

In response to an issue diagnosis, or a prediction that an issue is growing (e.g., application performance has begun to degrade at a rate above an observed benchmark), the control plane instructs the relevant data planes to perform actions that attempt to correct the anomalies that are being detected in real-time, therefore maintaining high performance of the application autonomously, without human intervention. A reporting API and dashboard is provided for the human SREs, developer and architects to check the status and the history of all the corrections the system has autonomously taken.

The control plane implements heuristics or machine learning models to automatically issue diagnose applications and redress those issues. A heuristic model makes use of tailored circumstance settings based off system benchmarks. Particular sets of circumstances lead to executing a particular, escalating list of remedial actions. In some embodiments, observed results from a first set of remedial actions lead to a different, or shifted set of escalating remedial actions. A machine learning model bases a selected remedial action based on developing circumstances that were previously observed in an underlying training data set.

An application may have a number of issues with a number of solutions at any given service or service group. Existing visualization technology provides tools to human architects to make good choices, but those choices are made slowly. The human must be available and process the logged information. A self-healing control plane can make a better choice in less time.

In some embodiments, once an anomaly is discovered, the control plane attempts an escalating list of remedial actions to resolve the anomaly. In other embodiments, the machine learning model employing hidden Markov models or convolutional neural networks with training of a history of anomalies, conditions/states the anomalies were detected in and successful remedial actions.

For example, the latency on a given service or service group may be higher than a benchmark amount. The reason may be because the error rate on the service or service group is too high, or there is a network issue. Network issues may have multiple root causes. For example, the web hosting service may be experiencing a high load of requests (e.g., perhaps by other 3rd parties running their unrelated applications) and the correct redress action is to redirect requests to a similar or matching service/service group operating on a different web hosting service until the request load on the relevant web hosting service reduces (e.g., wait it out).

Other network issues may result from a given node of a service/service group may be receiving a high load of requests. Where such action occurs, an effective solution is to rate limit requests to the given node and direct other requests to other, similar nodes running similar services/service groups. Traditional load balancers often take a different action of completely shutting down a given node and directing traffic to remaining nodes. Completely shutting down a node puts additional stress on a network when compared to simply rate-limiting the high-traffic node. Node exclusion is often too aggressive a solution.

The load balancer takes a simplistic response to the issue rather than diagnose the issue and attempt to resolve. Quarantine and wait for a human are inefficient and slow solutions. Comparatively, rate-limiting a troubled node addresses the problem in real-time.

Where an error rate is higher than an acceptable bench mark, the control plane may roll a given service/service group back to a previous working/stable version that did not have the high error rate. Further, because the data plane proxies are delivering proxied packets to the control plane, the control plane is enabled to recover service requests that were subject to errors and resubmit the requests to the rolled back version of the service. Each action is taken automatically by the control plane and does not require human intervention.

The redress action is taken in real-time, rather than requiring action of a human architect. Where an application operates constantly, the ability to remove the human from the operation and enable autonomous action improves uptime and throughput of an application.

Examples of issues that the control plane may diagnose via data plane reporting include: a change in latency of a given service or service group, a change in error rate where error occur via connection errors (Layer 4 error) or active system errors (Layer 7 error), security anomalies (e.g., certificate expiration), and cascading errors.

Cascading errors occur when one problem leads to other interconnected problems. Associated anomalies logged by the data plane include time stamps that the control plane is able to process quickly and take remedial action on. The first occurring anomaly is corrected and other cascading issues are resolved in response.

Figure 10:
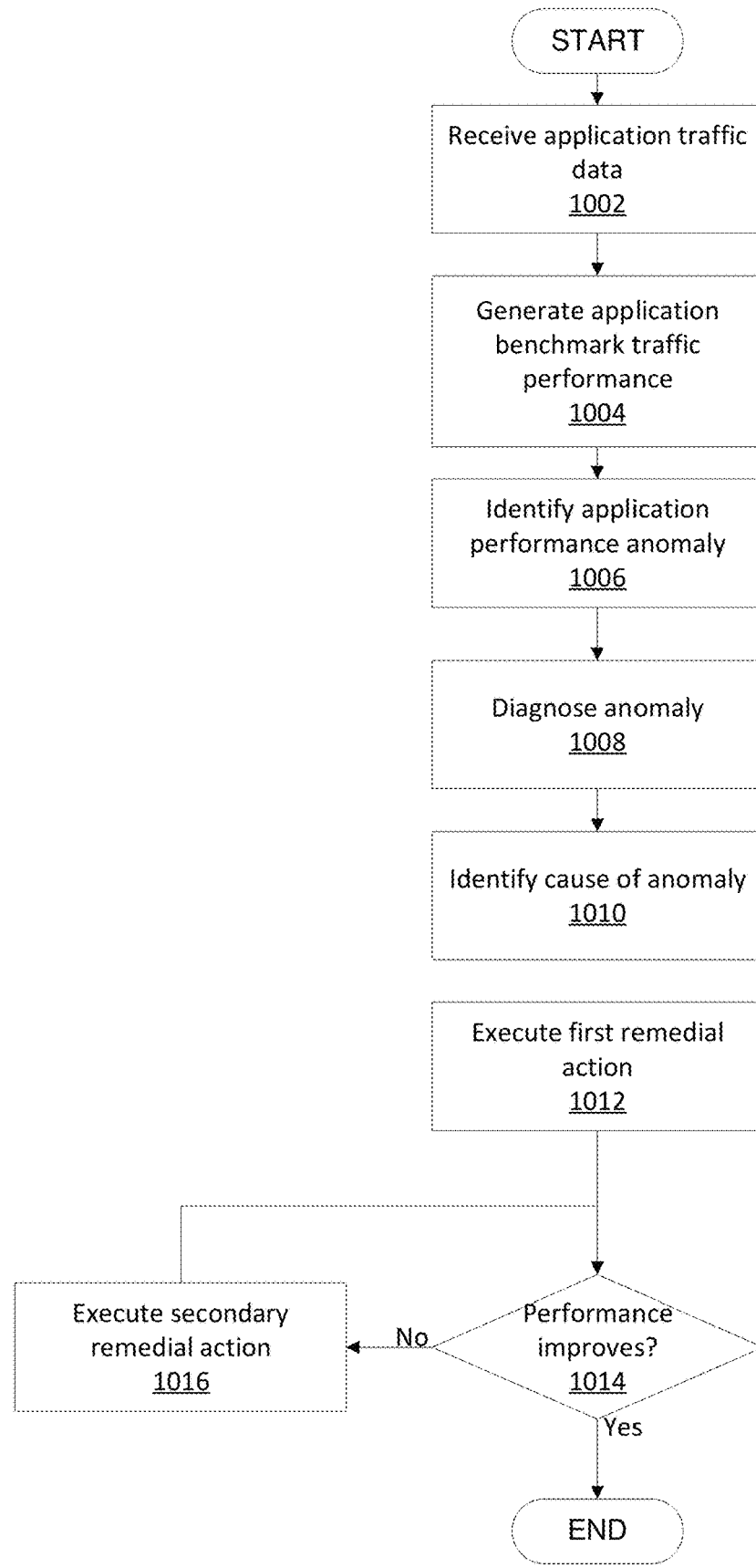
FIG. 10 is a flowchart illustrating a self-healing microservices network.

FIG. 10 is a flowchart illustrating a self-healing microservices network. In step 1002, the control plane receives traffic data from the data plane proxies. In step 1004, the control plane develops a benchmark state for the microservices application based on the traffic data received from the data plane proxies. In some embodiments, the data plane includes more granular benchmark models that are specific to the operation of particular APIs or service groups of APIs. In step 1006, the system recognizes an anomaly. Recognition of an anomaly may be by the control plane using an overall holistic view of application traffic, or a more granular detection by elements of the data plane.

In step 1008, the system diagnoses the anomaly automatically based on the underlying benchmark models and the real-time current observed conditions. A character of the anomaly may be objectively identified/categorized through passively detected changes in traffic or the processing of traffic. In some embodiments, active probes by the control plane or the data plane investigate underlying status of various nodes or APIs. Anomalies are based on thresholds and changes in expected deltas.

Diagnosis comes down to identifying the location of a given anomaly and whether the given anomaly pertains to a network layer error (L4), an application layer error (L7), protocol or security issues, or network responsiveness issues.

In step 1010, based on the type of anomaly identified, a root cause of the anomaly is identified based on observable characteristics of application traffic as compared to the benchmark model. In many cases, there may not be an actual issue that is affecting performance of the application, but an issue may be projected. Because a machine model is responding to the potential anomaly, there is significantly less concern with over flagging anomalies.

At a certain point of anomaly logging, there is a saturation point that a human can no longer process or make sense of in a relevant or useful time period. Therefore, where a human is required to respond, anomaly flagging occurs for the most extreme variances from benchmarks only. The remedial measures taken by the machine model are often less severe than would otherwise be implemented by a human; thus, even if a "budding" anomaly is detected (e.g., an anomaly that would not be logged for a human in order to prevent saturation), and there is no real issue, the responsive remedial action taken by the system is minimally invasive, and proactive such as to detrimentally affect the application performance.

In step 1012, based on the root cause, the system executes a first remedial action. Severity of the first remedial action varies based on observed circumstances. For so-called "budding" anomalies, the remedial action taken is minimally invasive (e.g., latency on a given node is degrading slowly; therefore, mild rate limitations on that node for a short period, thereby diverting traffic to another, similar node is a minimally invasive action). For larger anomalies that occur quickly, the system responds quickly and with a more severe response. The so-called severity or magnitude of the remedial action taken depends on the rate of application performance degradation.

In step 1014, the system evaluates the system after the first remedial action and determines whether the action improved application performance. Where application performance continues to degrade at the same or a faster rate, the system reevaluates the cause of the issue and, in step 1016 executes a secondary remedial action. In step 1018, additional remedial actions are taken so long as the application performance continues to degrade at the same or a higher rate.

Exemplary Computer System

Figure 11:
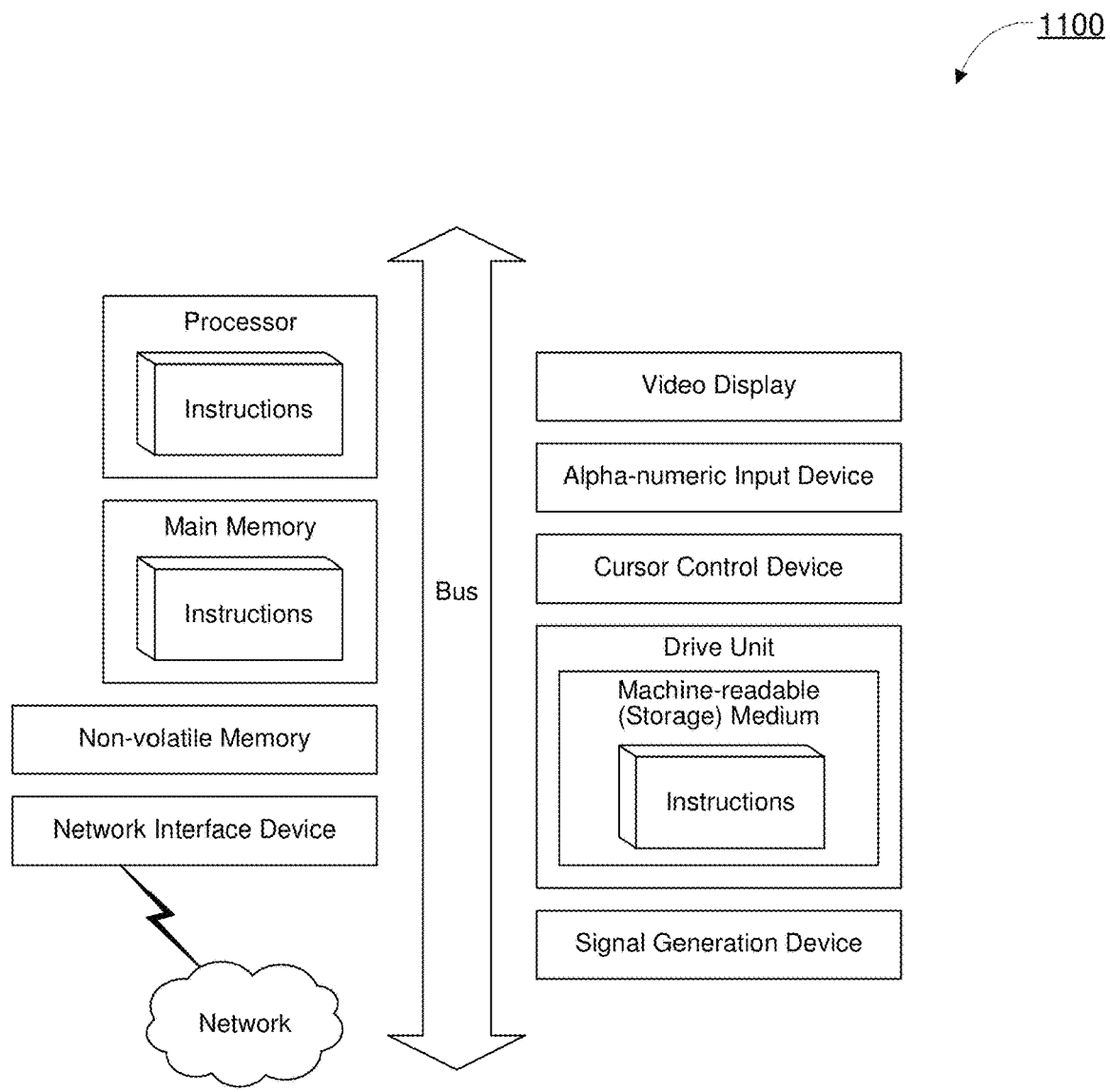
FIG. 11 depicts a diagrammatic representation of a machine in the example form of a computer system within a set of instructions, causing the machine to perform any one or more of the methodologies discussed herein, to be executed.

FIG. 11 shows a diagrammatic representation of a machine in the example form of a computer system 1100, within which a set of instructions for causing the machine to perform any one or more of the methodologies discussed herein may be executed.

In alternative embodiments, the machine operates as a standalone device or may be connected (networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone or smart phone, a tablet computer, a personal computer, a web appliance, a point-of-sale device, a network router, switch or bridge, or any machine capable of executing a set of instructions (sequential or otherwise) that specify actions to be taken by that machine.

While the machine-readable (storage) medium is shown in an exemplary embodiment to be a single medium, the term "machine-readable (storage) medium" should be taken to include a single medium or multiple media (a centralized or distributed database, and/or associated caches and servers) that store the one or more sets of instructions. The term "machine-readable medium" or "machine readable storage medium" shall also be taken to include any medium that is capable of storing, encoding or carrying a set of instructions for execution by the machine and that cause the machine to perform any one or more of the methodologies of the present invention.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine or computer-readable media include, but are not limited to, recordable type media such as volatile and non-volatile memory devices, floppy and other removable disks, hard disk drives, optical disks (e.g., Compact Disk Read-Only Memory (CD ROMS), Digital Versatile Discs, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

All patents, applications and references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for.") Accordingly, the applicant reserves the right to add additional claims after filing the application to pursue such additional claim forms for other aspects of the disclosure.

The invention claimed is:

1. A method comprising:
   establishing a microservice architecture application including a plurality of services, the plurality of services are each an application program interface (API) performing a piecemeal function of an overall application function, each service including a data plane proxy wherein the data plane proxy reports operation of each service of the plurality of services to an application control plane;
   establishing an application performance benchmark for each service in the microservice architecture application;
   identifying an anomaly in application operation based on exceeding a threshold associated with the application performance benchmark, the anomaly occurring on a first node associated with a first service of the plurality of services;
   in response to said identifying, automatically executing a first remedial action including any of:
      roll-back a version of a first API instanced on the first node to a previous stable version; or
      registering a certificate of the first node.

2. The method of claim 1, further comprising:
   reversing the first remedial action.

3. The method of claim 1, further comprising:
   automatically executing a second remedial action in response to a detection that the anomaly persists after the first remedial action, wherein the second remedial action has a different type than the first remedial action.

4. The method of claim 1, wherein the threshold associated with the application performance benchmark is a smaller change relative to the application performance benchmark than a threshold associated with system administrator anomaly logging.

5. The method of claim 1, wherein the anomaly is a change in a rate of occurrence of layer 7 of the first API, and the first remedial action is said roll-back.

6. The method of claim 1, wherein the anomaly is an expired authentication of the first API, and the first remedial action is said registering.

7. The method of claim 1, wherein a second node of the microservice architecture application is hosted by a different web service than the first node.

8. A system comprising:
   a processor; and
   a memory including a plurality of program constructs that are executed by the processor, the plurality of program constructs including:
      a microservice architecture application including a plurality of services, the plurality of services are each an application program interface (API) performing a piecemeal function of an overall application function, each service including a data plane proxy;
      an application control plane that communicates with each data plane proxy on operation of a respective service, the application control plane is configured to establish an application performance benchmark for each service in the microservice architecture application and identify an anomaly in application operation based on exceeding a threshold associated with the application performance benchmark, the anomaly occurring on a first node associated with a first service of the plurality of services, wherein the application control plane is configured to automatically execute a first remedial action in response to identification of the anomaly, the first remedial action including any of:
         roll-back a version of a first API instanced on the first node to a previous stable version; or
         registering a certificate of the first node.

9. The system of claim 8, wherein the application control plane is further configured to:
   reverse the first remedial action.

10. The system of claim 8, wherein the application control plane is further configured to:
   automatically execute a second remedial action in response to a detection that the anomaly persists after the first remedial action, wherein the second remedial action has a different type than the first remedial action.

11. The system of claim 8, wherein the threshold associated with the application performance benchmark is a smaller change relative to the application performance benchmark than a threshold associated with system administrator anomaly logging.

12. The system of claim 8, wherein the anomaly is a change in a rate of occurrence of layer 7 of the first API, and the first remedial action is said roll-back.

13. The system of claim 8, wherein the anomaly is an expired authentication of the first API, and the first remedial action is said registering.

14. The system of claim 8, wherein a second node of the microservice architecture application is hosted by a different web service than the first node.

15. A method comprising:
establishing a microservice architecture application including a plurality of services, the plurality of services are each an application program interface (API) performing a piecemeal function of an overall application function, each service including a data plane proxy wherein the data plane proxy reports operation of each service of the plurality of services to an application control plane;
establishing an application performance benchmark for each service group in the microservice architecture application, wherein each service group is a plurality of microservices that collectively perform a business flow of the microservices architecture application;
identifying an anomaly in application operation based on exceeding a threshold associated with the application performance benchmark, the anomaly occurring on a first service group associated with a set of microservices of the plurality of services;
in response to said identifying, automatically executing a first remedial action including any of:
roll-back a version of services within the set of microservices to a previous stable version; or
registering a certificate of the first service group.

16. The method of claim 15, further comprising:
reversing the first remedial action.

17. The method of claim 15, further comprising:
automatically executing a second remedial action in response to a detection that the anomaly persists after the first remedial action, wherein the second remedial action has a different type than the first remedial action.

18. The method of claim 15, wherein the anomaly is a change in a rate of occurrence of layer 7 of the first service group, and the first remedial action is said roll-back.

19. The method of claim 15, wherein the anomaly is an expired authentication of the first service group, and the first remedial action is said registering.

20. The method of claim 15, wherein roll-back of the version does not roll back each microservice in the first service group.

* * * * *